United States Patent [19]

Honma et al.

[11] 3,825,691

[45] July 23, 1974

[54] F-T RADA RECEIVER WITH LEVEL DISCRIMINATION

[75] Inventors: Takamichi Honma; Shigeru Igarashi; Hiroshi Harada, all of Tokyo, Japan

[73] Assignee: Nippon Electric Company Limited, Tokyo, Japan

[22] Filed: July 17, 1972

[21] Appl. No.: 272,514

[30] Foreign Application Priority Data

July 16, 1971 Japan .............................. 46-53343

[52] U.S. Cl. .............................................. 179/15 BA

[51] Int. Cl. .............................................. H04j 3/00

[58] Field of Search ........ 179/15 BA; 325/473, 323, 325/324, 326

[56] References Cited

UNITED STATES PATENTS

| | | | |
|---|---|---|---|
| 2,381,847 | 8/1945 | Ullrich | 179/15 BA |
| 3,261,920 | 7/1966 | Aaron | 179/15 BA |
| 3,292,178 | 12/1968 | Magnuski | 179/15 BA |
| 3,353,108 | 11/1967 | Branham | 325/324 |
| 3,558,917 | 1/1971 | Crouse | 325/473 |

*Primary Examiner*—David L. Stewart

*Attorney, Agent, or Firm*—Sughrue, Rothwell, Mion, Zinn & Macpeak

[57] ABSTRACT

An F-T RADA receiver is provided with level discriminating means, including automatic gain control means. The level discriminating means exerts filtering action on the signal pulses having the frequency-time relation giving the probable address of the receiver with respect to the relative levels of such pulses so as not to produce the output signal from the signal pulses which are not of relatively uniform levels and are consequently judged to be signal pulses of false addresses but so as to produce the output signal from the signal pulses which are of relatively uniform levels and are accordingly discriminated as signal pulses of the true address.

13 Claims, 6 Drawing Figures

F-T RADA RECEIVER WITH LEVEL DISCRIMINATION

BACKGROUND OF THE INVENTION

This invention relates to a receiver for use in an F-T RADA (frequency-time random access discrete address) system wherein a plurality of transmission channels are provided within a particular radio frequency band by identifying each channel with a series of those signal pulses of a plurality of different frequency slots assigned to the specific channel which are placed at a like number of different time slots allotted also to the channel.

As is widely known, a transmitter for an F-T RADA system comprises means for converting an information signal to be sent to a particular receiver, such as a speech signal, into a pulse signal, or a series of information pulses, either by way of the digital communication techniques, such as the delta modulation, the pulse code modulation, or the DATEC modulation, or by way of the pulse position modulation techniques, such as the pulse position modulation or the QPP modulation. The transmitter further comprises F-T matrix means for converting the information pulses into signal pulses placed at those different frequency and time slots assigned to the particular receiver. The radio frequency signal pulses to be sent to a receiver are thus furnished with the address of the receiver determined by the frequency slots and the time slots. In compliance with the construction of the transmitter, a receiver comprises frequency selective detector means for detecting from the incoming radio frequency signal pulses of various frequency and time slots a plurality of pulse trains, or successive sets of frequency slot pulses, according to the frequency slots allotted to the receiver, and time slot discriminating means including either delay lines or registers for selecting those pulses, one from each of the pulse trains, which comply with the time slots allotted to the receiver to derive from the successive sets of the frequency slot pulses a series of reproduced information pulses. In other words, the receiver comprises address decoder means for selecting those pulses from the radio frequency signal pulses of various frequency and time slots which are possessed of the address of the receiver to derive the reproduction of the information pulses generated at the participant transmitting station. The receiver further comprises means or demodulating the information pulses into the reproduction of the information signal. In such an F-T RADA system, the transmissions among a plurality of stations are simultaneously carried out within a common radio frequency band comprising the frequency slots of the addresses of the various stations in the system, each station selecting the desired station or stations by its or their addresses.

The conventional receivers for the F-T RADA systems, however, have serious defects that limit the field of application of the system.

More particularly, the frequency selective detector output signals having higher and lower levels than a predetermined level are judged to be representative of logic "1" and "0," respectively, so as to enable the F-T matrix, which is a digital AND circuit relating to pulses of the combined frequency and time, to discriminate between the address of the own station and those of others. When the participant transmitting station is located at a long distance so as to provide only weak signal strength at the receiver and when a multitude of stations are also transmitting the radio frequency signal pulses for other stations, pulses from the undesired stations pass through the F-T matrix resulting in a considerable number of false information pulses. In other words, the signal pulses bearing the false addresses produce false information pulses to result in deterioration of the S/N ratio. This is disadvantageous in increasing the number of simultaneously transmitting stations. For example, the pulse position modulation provides excellent tone quality and a long sampling period and has rationality of conforming to the laws of sampling. However, the pulse position modulation, when applied to the RADA system, would result in considerably deteriorated intelligibility because of the false address signal pulses and would be even inferior to the ternary delta modulation insofar as the intelligibility is concerned.

Another serious defect, which would even invalidate the F-T RADA system, results from the use of different pulses of adjacent frequencies. In general, a signal pulse has a certain expanse of the frequency spectrum distribution and consequently a considerable amount of overlap into the other frequency slots. Although this amount of the undesirable leakage is reduced if the pulses are shaped either into the Gaussian or the cosine square distribution, it is so difficult as practically impossible to reduce the leakage by 50 dB or more below the level in the pertinent frequency slot. Furthermore, the filter means of a finite band width used for the frequency slots, inevitably produces leakage of the signal into the other frequency slots. Even with Gaussian distribution filter means, it is considerably difficult to reduce this latter leakage by 50 dB or more below the level in the pertinent frequency slot. In addition, it is known that the pulse signal, if sent through a radio transmission line as is very often the case, reaches the receiver through a plurality of paths of different lengths of propagation so that the resultant composite pulses produced by the receiver have widened pulse width to provide additional undesirable signal leakage. These so-to-speak peculiar phenomena give rise to the misconnections to some other stations of different addresses and the crosstalk, resulting in the intelligible interferences, and are far more harmful because of their random nature than the false address signal pulses which also result in non-intelligible noises.

In view of the fact that the expectation for the dynamic range is of the order of 40 dB through 50 dB due to the above-mentioned defects, F-T RADA systems with automatic power control such as resorted to in satellite communication have been proposed wherein use is made of repeating stations to keep the levels of the incoming signals substantially constant at each of the repeating and the receiving stations. It is, however, necessary according to the proposal to use the repeating stations and different frequency bands for transmission and reception.

SUMMARY OF THE INVENTION

It is therefore an object of the present invention to provide an F-T RADA receiver wherein a desired participant station is selected from a plurality of stations assigned with a common frequency band and yet substantially without any misconnections with the nearer stations.

It is another object of this invention to provide an F-T RADA receiver of the type described, which is substantially never subjected to intelligible crosstalk or interference.

It is still another object of this invention to provide an F-T RADA receiver wherein the false address signal pulses are rejected to a remarkable extent to improve the S/N ratio.

It is yet another object of this invention to provide an F-T RADA receiver which can be used in an F-T RADA system having a plurality of repeating stations with the use of a single common frequency band.

Other objects of this invention will become clear as the description proceeds.

It is noted according to this invention that the radio frequency signal pulses sent from an F-T RADA transmitter with a particular address and caught by the receiver having the particular address have relatively uniform relative field strengths or levels, which may somewhat differ according to the paths of propagation, that the signal pulses which are sent from undesired stations and bear the false addresses have considerable random level differences in most cases, and that the signal pulses which would result in the misconnection have always large level differences, differing from the pulses of a frequency slot of the address to those of other frequency slots of the address and from the pulses of a time slot of the address to those of other time slots of the address. This invention makes use of these facts and discriminates between the addresses borne by the signal pulses with reference not only to the frequency and the time slots but also to the relative field strength levels to select the signal pulses of the true address from those of other addresses. A receiver according to this invention may therefore be called an F-T-L RADA receiver, which makes use of the frequency slots, the time slots, and the relative level slots.

According to this invention, a receiver for an F-T RADA system is provided with means for discriminating between the incoming radio frequency signal pulses with reference to the frequency and the time slots of the address assigned to the receiver, as before. The receiver, however, is characterized by provision of means for discriminating in effect whether or not the relative levels of the radio frequency signal pulses found to have the address of the receiver fall within a predetermined range. In other words, this invention provides a receiver for an F-T RADA system having means for selecting the signal pulses of the frequency slots and the time slots assigned to the receiver from the incoming signal pulses wherein the improvement comprises means for detecting the relative levels of the incoming signal pulses and means for effecting a logic operation, such as the AND or the OR operation, on the output signals of the selecting and the detecting means.

The receiver receives the frequencies in the time slots. Each detected frequency is designated a signal pulse and the group of frequencies received in one information or sample period is a set of signal pulses. If the set of signal pulses corresponds in frequency slots and time slots to the assigned receiver address the set of pulses is referred to as a probable address. If the set of pulses forming a probable address conforms to the pulse level requirements of the present invention the probable address is a true address and the system generates an information pulse.

With a view to discriminating between the relative levels of the incoming radio frequency signal pulses, a receiver according to this invention may be comprised of an automatic gain control circuit responsive to a gain control signal for reducing and raising the gain of the amplifier means for the signal pulses when the gain control signal has a first and second value, respectively, limiter means responsive to a limiter control signal for selectively limiting the levels of the signal pulses to a first predetermined high level when the limiter control signal has a first valve and to a second predetermined medium level when the limiter control signal has a second value, and means for discriminating with reference to the first, second, and third levels the levels of each set of those gain controlled signal pulses which have the probable address of the receiver for producing a gain control signal of the first and second values when the levels of each set of the last-mentioned pulses are at least equal to the second level and lower, respectively, and for producing the limiter control signal of the first value when the levels of said set are at least equal to said third level and for producing the limiter control signal of the second value when each set of such pulses contain at least one pulse whose level is lower than the third level. The level discriminating and control signal producing means rejects the last-mentioned pulses as not being the signal pulses of the true address in either of the events such that the last-mentioned pulses contain at least one pulse whose level is lower than the third level and such that the last-mentioned pulses contain in the presence of the limiter control signal of the first value at least one pulse whose level is equal to the first level. The level discriminating and control signal producing means judges the signal pulses to be the desired signal pulses when the level of the signal pulses in the presence of the limiter control signal of the first value are at least equal to the third level and lower than the first level.

In a preferred aspect of this invention, the incoming radio frequency signal pulses are detected by frequency slot detector means and amplitude limited by limiter means. The level limited signal pulses are encoded into a digital signal with respect to a modulus of a predetermined integer. For example, if modulus 8 is used, all levels would be encoded as levels 0 through 7. Thus, an amplitude level corresponding to the level 8 would be encoded as a 0 level, i.e., 8 is 0 mod 8. The quantized levels of the limited signal pulses are compared with one another by a comparator, or a first address decoder as called herein, which produces a comparator output digital signal representative of a level which is at most equal to the minimum quantization level of the compared levels. The second and the third predetermined levels are selected to be equal to the higher quantization levels with respect to the predetermined modulus. The first level is set at a quantization level lower than the third level modulo the predetermined integer. With a receiver according to this preferred aspect, the signal pulses whose levels are equal to or higher than the first level and lower than the third level modulo the predetermined integer are made equivalent to the signal pulses of the levels lower than the third level. In other words, the incoming radio frequency signal pulses of higher field strengths are rendered equivalent to those of lower field strengths.

In operation of a receiver according to the preferred aspect of this invention, it may be assumed that the receiver is at first in Stage A of operation as called hereinafter at which the receiver is searching for the presence of signal pulses having the probable address of the receiver. In Stage A operation the limiter means limits the signal pulses to the second level with the automatic gain control at first tending to raise the gain of the amplifier means. When the probable address is a false address, some of the digital signals may be representative of the levels lower than the third level with the result that the receiver is kept at Stage A. If the digital signals are representative of the third and the higher levels, the receiver is now put into Stage B of operation as referred to hereafter in which the levels of the signal pulses are limited to the first level to make the receiver judge from the levels of the signal pulses of the probable address whether the probable address is the true address or not. When the probable address is not the true address, some of the digital signals are representative of the first level and make the receiver return to Stage A. When the probable address is the true address, the digital signals are gain controlled to be representative of the second and/or the third levels. At Stage A of operation in which the signal pulses are limited to the second level, a receiver according to this invention does not carry out the discrimination with respect to the level slots but operates to produce the logic products of the pulses having the frequency slots and the pulses having the time slots as is the case with a conventional F-T RADA receiver. At Stage B, a receiver according to this invention produces the logic products of the pulses having the frequency slots, the pulses having the time slots, and the pulses having the uniform relative levels, or the relative level slots. It is to be noted in this connection that it is possible to embody this invention by substituting a conventional F-T RADA receiver for a receiver according to this invention while the latter is operating in Stage A.

After the presence of the desired signal pulses has been confirmed by a receiver according to the preferred aspect of this invention, the mode of operation of the comparator may be changed to derive from the digital signals a comparator output digital signal representative of a level which is at least equal to the maximum of the compared levels. This stage of operation is called hereafter Stage C, in which the receiver produces the logic sum of the signal pulses having the frequency and the time slots of the address and the relative level slots to maintain the reception of the desired radio frequency signal pulses, some of which might be masked by strong radio frequency signal pulses sent from some undesired nearer stations.

In another aspect of this invention, a receiver may additionally be comprised of a second address decoder as termed herein which produces the logic product of the frequency and the time slot signal pulses as a conventional F-T address decoder does. At Stage C, this latter receiver produces the logic products of the logic sum of the frequency-time-level slot signal pulses and the logic product of the frequency and the time slot signal pulses.

DESCRIPTION OF THE PREFERRED EMBODIMENTS

Figures 1, 4:
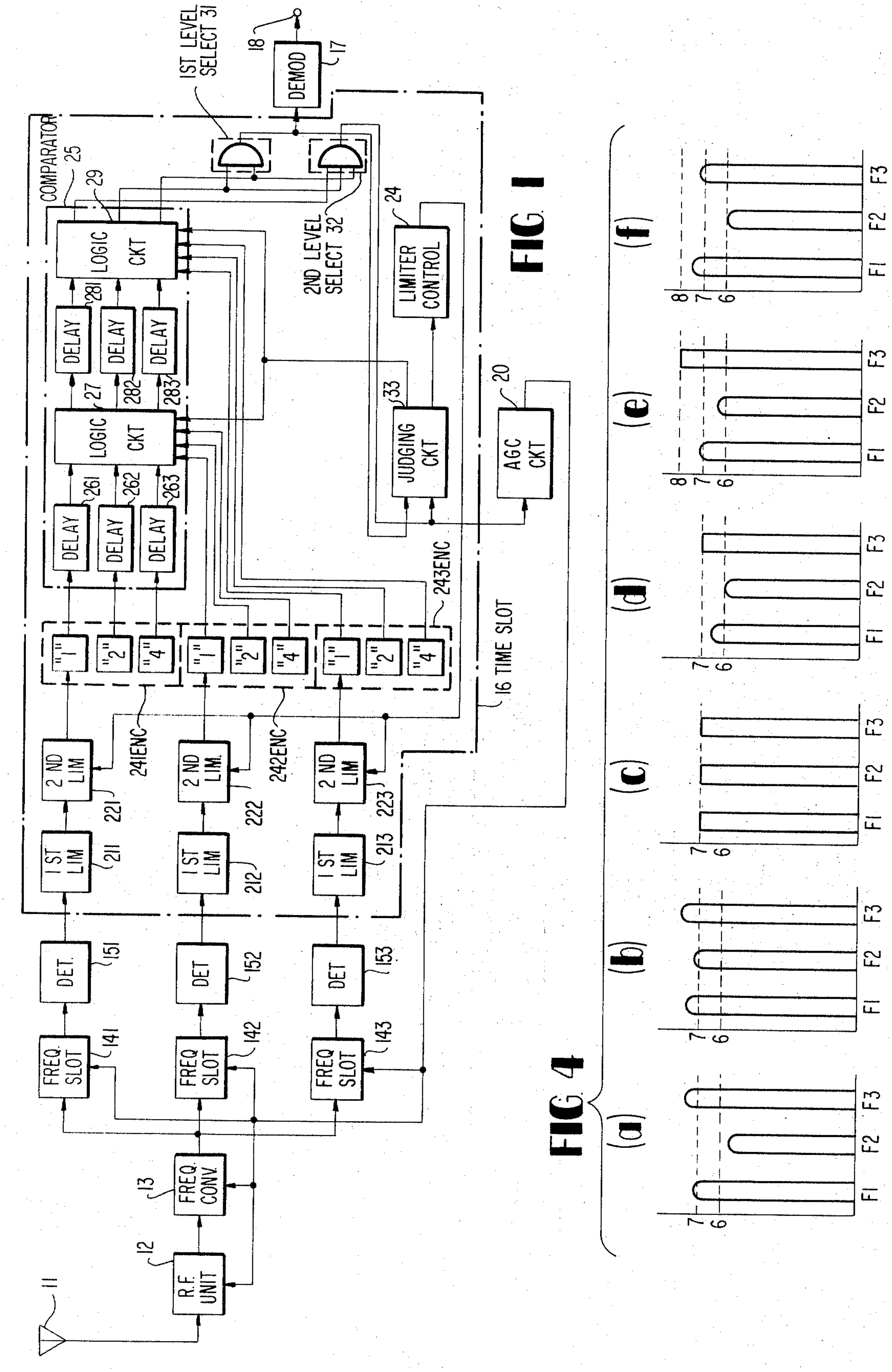
FIG. 1 is a block diagram of an F-T RADA receiver according to a first embodiment of the instant invention.
FIG. 4 illustrates the levels of some sets of signal pulses, each set of pulses bearing the probable address of the receiver.

Referring to FIG. 1, it is assumed that the address for an F-T RADA receiver illustrated therein is such that a signal pulse of a first frequency slot F1, another signal pulse of a second frequency slot F2, and a third signal pulse for a third frequency slot F3 appear at relative time positions of a first, a second, and a third time slot T1, T2, and T3, respectively, in each sampling or information period. It is further assumed here that the first through the third time slots appear in this order although the first through the third frequency slots F1 through F3 do not necessarily represent the relative magnitudes of the frequencies. As is known in the art, the receiver comprises an antenna 11 for receiving an incoming series of radio frequency signal pulses of various addresses, a radio frequency unit 12 including the antenna circuit and a high frequency amplifier, a frequency converter 13, a set of frequency selective amplifiers 141, 142, and 143 for selectively amplifying the intermediate frequency signal pulses of the frequency slots F1 through F3, respectively, a set of detectors 151, 152, and 153 for deriving a first through a third pulse train, or first through third frequency slot pulses, respectively, a time slot discriminator 16 responsive to the first through the third frequency slot pulses for deriving an information pulse each time one each of the first through the third frequency slot pulses occur at the first through the third time slots T1 through T3, a demodulator 17 for demodulating the information pulses in accordance with the modulation effected on the information signal at the transmitting end, and an output terminal 18 for the reproduced information signal. The demodulator 17 and the output terminal 18 may be replaced with a transmitter and a transmitting antenna if it is desired to use the receiver in a repeating station.

Further referring to FIG. 1, a first embodiment of this invention includes a level discriminator comprising various circuit units depicted in the time slot discriminator 16 for convenience of illustration and an automatic gain control circuit 20 responsive to a gain control signal for controlling in the manner later described the respective gains of the amplifier stages contained in the radio frequency unit 12, the frequency converter 13, and the frequency selective amplifiers 141 through 143. The circuit units shown in the time slot discriminator 16, some of which have the function of the time slot discrimination as will soon become clear, comprises a first set of limiters 211, 212, and 213 for limiting the levels of the signal pulses applied thereto to a predetermined first level, a second set of limiters 221, 222, and 223 put into and out of operation in the manner described hereunder for further limiting the levels of the signal pulses to a predetermined second level, a limiter control circuit 24 responsive to a limiter control signal for putting the second limiters 221 through 223 out of and into operation when the limiter control signal assumes a first and a second value, respectively, and first through a third binary encoders 241, 242, and 243 for encoding the level limited signal pulses into a first through a third binary coded signals modulo 8 ($=2^3$), each of the encoders having three stages for the binary digits of "1" ($=2^0$), "2" ($=2^1$), and "4" ($=2^2$). As will be understood from the description of a second embodiment, it is possible to provide only one limiter for each of the frequency slot pulse trains and further to combine the frequency selective amplifier and the associated single limiter into an integral circuit unit. Each of the binary encoders 241 through 243 may encode the concerned signal pulses with respect to any other modulus determined with reference to the level difference of the incoming signal pulses. Each encoder may produce a binary coded signal representative, for example, of a quantized level of 6 when the level of the frequency slot pulse is equal to or higher than level 6 and is lower than the next higher quantization level 7. The second level may be level 7 which is the highest quantization level modulo 8. The first level may be a quantization level which is lower at least by two quantization steps than the second level, such as 0, 1, . . . , or 5. By way of example, the first level is set at quantization level 0 modulo 8.

Still further referring to FIG. 1, the circuit units illustrated in the time slot discriminator 16 further comprises a comparator 25 for comparing in effect the relative time positions of the first through the third signals pulses with the first through the third time slots T1 through T3, to determine the existence of a probable address. The comparator also compares the levels of the signal pulses bearing the probable address with one another to produce, under the control of a mode selection signal, a binary coded comparator output signal. The output signal represents a quantization level equal to or less than the minimum of the three binary coded signals when the comparator is in the first mode of operation. The output signal represents a quantization level equal to or greater than the maximum of the three binary coded signals when the comparator is in the second mode of operation. More particularly, the comparator 25 comprises a number of delay and logic circuits. A first set of delay circuits 261, 262, and 263 delay the respective binary digits of the first binary coded signal by a first delay time T2 – T1 equal to the interval between the first and the second time slots T1 and T2. A first logic circuit 27 is responsive to the mode selection signal, the delayed digits from encoder 241, and the digits from encoder 242. The circuit 27 produces a binary coded output signal which is equal to or less than the minimum of a pair of the frequency slot binary coded signals spaced apart by the first delay time $T_2$ minus $T_1$ or equal to or greater than the maximum of such a pair. A second set of delay circuits 281, 282, and 283 delay the respective digits of the output binary signal a second delay time T3 – T2 equal to the interval between the second and the third time slots T2 and T3. A second logic circuit 29 is responsive to the mode selection signal, the delayed output digits of the first logic circuit 27, and the output digits of the third encoder 243 for likewise producing the binary coded comparator output signal. The logic circuits 27 and 29 are of similar construction to be illustrated with reference to FIGS. 2 and 3. As will have already been understood from the expressions of "minimum" and "maximum," the comparator 25 produces a binary coded signal which, in the first mode of operation, is equal or less than the input binary coded signals, and in the second mode, is equal or greater than such signals when a pair of the frequency slot binary coded signals are representative of the same number.

Yet further referring to FIG. 1, the circuit units shown in the time slot discriminator 16 still further comprises a first level selector 31 responsive to the comparator output signal for producing a first level selected signal which assumes a first value ("1") when the level of the comparator output signal is equal to or higher than said predetermined third level and which assumes a second value ("0") when the comparator output is less than said third level. A second level selector 32 responsive also to the comparator output signal producing a second level selected signal which has a first value ("1") when the level of the comparator output signal is equal to or higher than said second predetermined level and which has a second value ("0") when the comparator output signal is less than the second level. A judging circuit 33 is responsive to the first and the second level selected signals for producing the limiter control signal of its first value to put the second limiters 221 through 223 out of operation when the first and the second level selected signals assume their respective first and second values, for producing otherwise the limiter control signal of its second value to put the second limiters 221 through 223 into operation, for producing the mode selection signal of its first value to place the comparator 25 in the first mode of operation under the circumstances to be mentioned later, and for producing the mode selection signal of its second value to put the comparator 25 into its second mode of operation when the first level selected signal keeps its first value a predetermined time to be mentioned hereinafter. The third level is lower than the second level at least by one quantization step.

The first level selected signal, which is delivered to the demodulator 17, is the information signal and it is generated when those of the radio frequency signal pulses which bare the probable address of the receiver and are in effect level controlled have relatively uniform levels falling within a predetermined range to make the first level selected signal assume its first value. The second level selected signal is applied to the gain control circuit 20 to effect the automatic gain control when the same has its first value and otherwise to render the gain contro ineffective, with a relatively large time constant than the interval between the consecutive information pulses. It is to be noted that the automatic gain control is ineffective, as called herein, when the gains of the amplifier stages are allowed to rise rather than kept at the reduced values. In the example being illustrated, the first level selector 31 comprises an AND gate supplied with the most significant and the next significant digits of the comparator output binary coded signal so as to produce an information pulse, corresponding to logic "1," when the levels of the level controlled signal pulses having the probable address are within the predetermined range of producing the comparator output signal of binary 110 and 111 representative of decimal 6 and 7. These levels, such as levels 6 and 7, which have equal effects on the subsequent circuit units will be termed the "like levels." Unless the comparator output signal is representative of levels 6 and 7, the first level selected signal assumes its second value which is now logic "0." In further accordance with the example being illustrated, the second level selector 32 comprises an AND gate supplied with all digits of the comparator output signal so as to make the second level selected signal assume the first value which is logic "1" when the comparator output signal is representative of level 7 and otherwise assume the second value which is logic "0." Thus, the judging circuit will render limiters 221-223 out of operation when the comparator output is equal to level 6. Otherwise, limiters 221–223 will be in operation.

Figure 2:
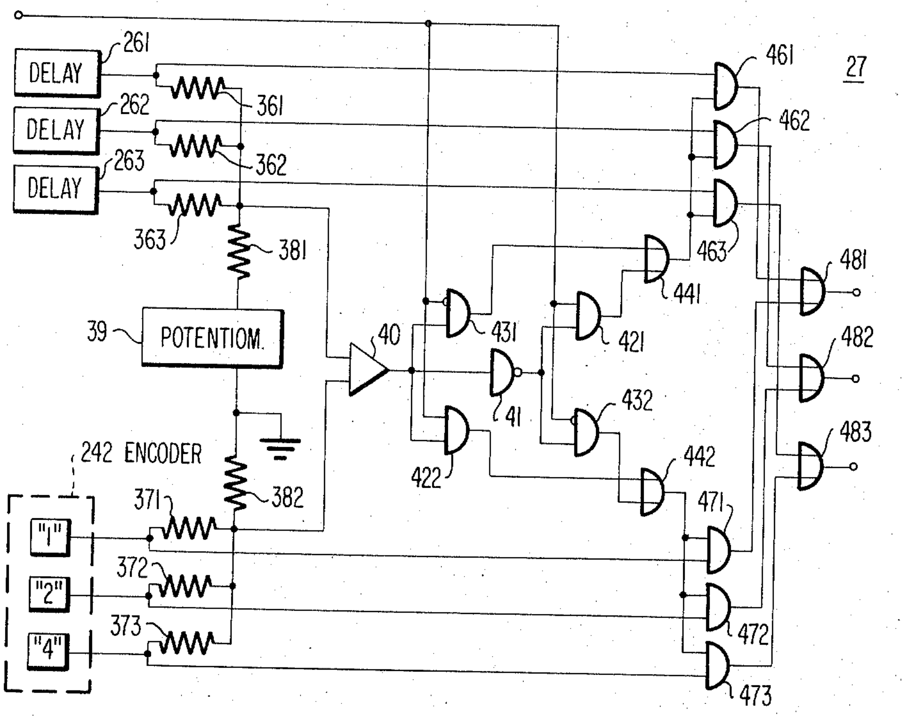
FIG. 2 shows a circuit diagram, partly in blocks, of an example of a logic circuit used in the receiver depicted in FIG. 1.

Referring to FIG. 2, a first logic circuit 27 comprises a first set of weighing resistors 361, 362, and 363 connected with the first delay circuits 261 through 263, respectively, and responsive to the respective delayed first frequency slot encoder stage output signals for producing electric currents proportional to the respective binary digits "1," "2," and "4," a second set of similar weighing resistors 371, 372, and 373 connected with the respective stages of the second frequency slot binary encoder 242, a first and a second summing resistors 381 and 382 connected with the first and the second weighing resistors 361 through 363 and 371 through 373, a potentiometer 39 connected with the other end of the first summing resistor 381 for producing a voltage representative of about a half of the quantization step, and an operational amplifier 40 responsive to the voltage adjusted first and the second decoded signal voltages. Amp 40 produces a negative or logic "0" signal when the first binary signal is equal to or greater than the second binary signal. A positive or logic "1" output is produced when the second binary signal is greater than the first. The logic circuit 27 further comprises an inverter 41 for inverting the polarity of the operational amplifier output signal, a first and a second AND gates 421 and 422 supplied with the mode control signal and with the inverter and the operational amplifier output signals, respectively, a first and a second inhibit gate 431 and 432 inhibited by the mode control signal and supplied with the amplifier and the inverter output signals, respectively, and a first and a second OR gate 441 and 442 supplied with the output signals of the first AND and inhibit gates 421 and 431 and with the output signals of the second AND and inhibit gates 422 and 432, respectively. The logic circuit 27 still further comprises a first set of AND gates 461, 462, and 463 supplied with the output signal of the first OR gate 441 on the one hand and the delayed first frequency slot encoder stage output signals, respectively, on the other hand, a second set of AND gates 471, 472, and 473 supplied with the output signal of the second OR gates 442 and the respective second frequency slot encoder stage output signals, and a set of outut OR gates 481, 482, and 483 for deriving the signals delivered thereto from either of the first and the second set AND gates 461 through 463 and 471 through 473 as the output signals of the logic circuit 27.

Further referring to FIG. 2, the first value of the mode selection signal for the logic circuit 27 is either the ground voltage or the logic "0" voltage. The second value is given either by the open circuit for the inhibit input terminals of the inhibit gates 431 and 432 and for the corresponding input terminals of the AND gates 421 and 422 or by the logic "1" voltage. The operation will first be described assuming the mode control signal has its first value, logic "0." In this mode, gates 431 and 432 are operative whereas gates 421 and 422 are inoperative. If the binary signals from delay means 261–263 is equal to or greater than the binary signals from encoder 242, the output from amp 40 will provide a logic "0" output which is inverted to a logic "1" by inverter 41 and applied to operative gate 432. A logic "1" from 432 passes through OR gate 442 and renders gates 471–473 operative to pass the second binary signal therethrough and further through OR gates 481–483 to the logic circuit output.

Still in the same mode, i.e., mode control is logic "0," if the second binary signal is the larger of the two, the output from amp 40 will be a logic "1." The latter logic signal passes through gates 431 and 441 to allow the first binary signal to pass to the output of the logic circuit. Thus, as will be appreciated, when the logic circuit is in the first mode, the lesser of the two binary inputs will pass to the output.

When in the second mode, the mode control signal is a logic "1" and therefore gates 421 and 422 become operative whereas gates 431 and 432 are inhibited. This simply reverses the selection of the binary signal to be applied to the output. In this case the greater of the two input binary signals is applied to the output.

This construction of the logic circuit is also applicable to the second logic circuit 29.

Figure 3:
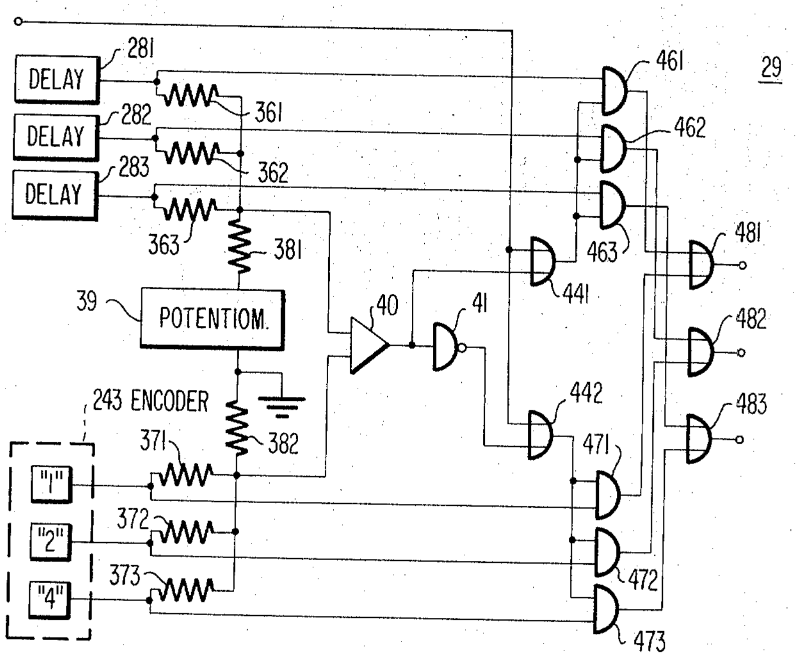
FIG. 3 similarly illustrates another example of the logic circuit.

Referring to FIG. 3, a second logic circuit 29 for the second and the third frequency slot binary coded signals may have a simpler construction than the logic circuit 27 or 29 illustrated with reference to FIG. 2, wherein the AND and the inhibit gates 421, 422, 431, and 432 of the latter logic circuit are omitted and wherein the mode selection signal is directly supplied to the first and the second OR gates 441 and 442 while the output signals of the operational amplifier 40 and the inverter 41 are supplied to the first and the second OR gates 441 and 442, respectively. With the mode selection signal of the first value mentioned above, the logic circuit shown in FIG. 3 produces the second frequency slot coded signal when the same represents a smaller number than the third frequency slot coded signal does and produces the third frequency slot coded signal when this signal is either representative of a number equal to or less than the number represented by the second frequency slot coded signal. With the mode selection signal of the second value mentioned above, the first and the second set AND gates 461 through 463 and 471 through 473 are all opened with the result that each of the output OR gates 481 through 483 produces the logic sum of the respective digit signals of the second and the third frequency slot coded signals. For example, the logic circuit 29 produces an output signal representative of level 7 when the frequency slot coded signals represent levels 3 and 4, respectively. For the frequency slot coded signals representative of levels 4 and 5, respectively, the logic circuit 29 produces an output signal representative of level 5. In this manner, the logic circuit 29 supplied with the mode selection signal of the second value produces an output signal representative of a number which is either equal to or greater than the maximum of the numbers represented by the frequency slot coded signals supplied also thereto.

Referring now to FIG. 4 as well as FIGS. 1 through 3, let it be assumed that the receiver is put in Stage A of operation at which the automatic gain control is ineffective at first and at which the judging circuit 33 produces the limiter control signal of the second value and the mode selection signal of the first value to keep the second limiters 221 through 223 operative and to put the comparator 25 in the first mode of operation. While no incoming radio frequency signal pulses reach the antenna 11, the binary coded signal appearing at the output terminals of the comparator 25 is representative of level 0. Consequently, the second level selector 32 produces a logic "0" value to keep the automatic gain control ineffective and to maintain the limiter control and the mode selection signals in their second and first values, respectively. While the incoming signal includes no signal pulses provided with the probable addresss of the receiver, the binary coded signal appearing through the comparator 25 remains at level 0. Let it now be assumed that the incoming signal comprises the signal pulses of the probable address of the receiver. Although the amplifier stages are given their sufficiently high gains, either the fact that the probable address is not the true address but a false address or the fact that some of the signal pulses have undergone a disturbance, results in a pulse in the probable address pulses, or a set of the frequency slot pulses having the pertinent time slots, which has such a low level as shown in FIG. 4(a) as may be encoded by the pertinent one of the encoders 241 through 243 into a binary coded signal representative of level 5 or less. Such a set of pulses produces a comparator output binary coded signal representative of level 5 or less. The outputs from 31 and 32 will remain a logic "0".

Next, assume that the levels of the signal pulses which would result in the probable address pulses are as depicted in FIG. 4(b). These pulses will be limited by the first limiters 211 through 213 to level 8, which is 0 modulo 8, and then by the presently operative second limiters 221 through 223 so that the twice level limited probable address pulses would look as exemplified in FIG. 4(c). As a result, the comparator 25 produces a binary coded signal representative of level 7. The first level selector 31 gives the first level selected signal its first value to produce an information pulse. The second level selector 32 changes the second level selected signal from its second value to its first value to reduce the amplifier stage gains while the judging circuit 33 keeps the limiter control and the mode selection signals in their second and first values, respectively. Responsive to the reduction in gains, at least one of the probable address pulses will eventually become to have level 6 in the manner illustrated in FIG. 4(d). This set of pulses appears through the comparator 25 as a binary coded signal representative of level 6.

Stage B of operation begins as soon as the comparator 25 produces a binary coded signal representative of level 6, at which the judging circuit 33 produces limiter control signal of its first value to render the second limiters 221 through 223 inoperative. Responsive to the binary coded comparator output signal indicative of level 6, the second level selector 32 changes the second level selected signal from its first value to its second value to make the automatic gain control circuit 20 allow rise of the amplifier stage gains eventually after lapse of the time corresponding to the time constant, while keeping the comparator 25 in the first mode of operation. If at least one of the probable address pulse levels rises above level 0 as exemplified in FIG. 4(e) as a result of the second limiters 221–223 becoming inoperative, such a set of pulses appears through the comparator 25 as a binary coded signal representative of level 0 to return the operation of the receiver to Stage A. If the levels of the probable address pulses rises to level 7 or more but below level 0, the comparator 25 produces a binary coded signal indicative of level 7 to restore the operativeness of the second limiters 221 through 223. In this manner, the automatic gain control is effected to keep the levels of the probable address pulses between level 6 inclusive and level 8 exclusive in the manner exemplified in FIG. 4(f) if the levels of such pulses are relatively uniform. This means that the probable address is most likely the true address.

It may be recalled here that a conventional F-T RADA receiver has the filtering capability only for the frequency slots and the time slots while a receiver according to this invention has an additional novel filtering capability for the relative levels, or for the level slots, when operating at Stage B. Even if a signal incoming from an adjacent station becomes to have the false address as a result of the leakage of the signal, the receiver does not make the false address signal produce a continued series of the information pulses through the first level selector 31. It should, however be pointed out that the receiver according to this invention would fail to continue the proper performance if some of the strong radio frequency signal pulses having a different address happen to arrive at the receiver simultaneously with some of the radio frequency signal pulses of the true address and to have the same frequency slots as the concurrently arriving ones of the latter signal pulses so as to undesiredly strengthen some of the true address pulses. As will easily be understood, the chance of such accidental coincidence of the signal pulses increases with an increase in the number of the concurrently transmitting adjacent stations. Even under the circumstances, the signal pulses of the undisturbed true address appear with a certain probability. More specifically, let it be assumed that the probability of the concurrent occurrence of one of the strong signal pulses of the different address with one of the signal pulses of the true address, or the probability of occurrence of the disturbance, be one-half. In this event, the probability that none of the true address pulses consisting of three pulses is disturbed by the strong frequency slot pulses is $(1/2)^3 = 1/8$. With the average rate of $10 \times 10^3$ information pulses per second, the first level selector 31 reproduces the information pulses at the probability of one out of eight or at an average rate of $1.25 \times 10^3$ pulses per second. Expressed in another way, the probability that the strong radio frequency signal pulses prevent the first level selector 31 from reproducing the information pulses within a period of 6 milliseconds is $\exp(-1.25 \times 10^3 \times 6 \times 10^{-3}) = 4 \times 10^{-4}$. This means that the first level selector 31 produces at least one information pulse 6 milliseconds after the receiver has stepped into Stage B. It is therefore preferable, if no information pulse is produced within a period equal to or somewhat longer than a predetermined interval of, for example 6 milliseconds, after the receiver has stepped into Stage B, to make the judging circuit 33 switch in the manner to be presently described to return the receiver to Stage A because such stepping into Stage B of the receiver would most likely be as a result of misconnection.

Stage C of operation begins when the first level selector 31 produces at least one information pulse within the predetermined interval or somewhat longer after the receiver has stepped into Stage B. Responsive to the at least one information pulse, the judging circuit 33 changes the mode selection signal from its first value to its second value while keeping the limiter control signal in its first value. As has been described above, the level of the frequency slot pulse disturbed by a strong radio frequency signal pulse is limited by the always operative first limiters 211 through 213 to level 0. Inasmuch as the comparator 25 now operates in the second mode, the true address pulses, even disturbed, appear through the first level selector 31 not as a first level selected signal of its second value but as an information pulse. In this connection it should be noted that the receiver according to tnis invention has strong filtering action for levels of the signal pulses. This is because, even if the actual levels of the incoming radio frequency signal pulses distribute within as wide a range as 90 dB and even if the binary encoders 241 through 243 encode the signal pulses with respect to the modulus of as small a number as eight, it is possible to provide as many as fifteen level slots when 6 dB is selected for the predetermined relatively uniform range of the radio frequency signal pulses which are encoded into binary coded signals representative of levels 6 and 7.

It has already been pointed out that a conventional F-T RADA receiver has a fatal defect of reproducing the information pulses from those radio frequency signal pulses which are stronger than the radio frequency signal pulses of the true address. This makes a considerable percentage of the signal pulses of the false addresses. In contrast it is possible with the present invention to remarkably reduce occurrence of the false addresses in the incoming radio frequency signal pulses because of the capability of treating the strong signal pulses of the false address as equivalents of the very weak signal pulses. On the contrary it is impossible with the example of this invention so far described to reproduce the information pulses from the signal pulses which have the true address but are all covered by the disturbing signal pulses sent from the impertinent stations. In this latter event, the fact is that a conventional F-T RADA receiver has derived insignificant information pulses. It is already known that an effective remedy for eliminating this inconvenience in the case of the speech signals is to provide the demodulator with means for maintaining the information of the previous time points when the insignificant information is reproduced. More particularly, a PPM demodulator is provided with means for giving the reproduced information pulses the same time shift positions as the previous ones. A ternary delta or a DATEC demodulator is comprised of means for applying no signal to the demodulator in the presence of the insignificant information. A binary delta demodulator is comprised of means for supplying a signal whose level is a half of the output signal of the first level selector 31 when the information pulses are discriminated to have resulted from the signal pulses of the false addresses, which discrimination is easily feasible with this invention. This last means may comprise first limiters 211 through 213 for which the predetermined first level is level 1 which is equivalent to level 9 modulo 8, means for producing an activating signal when the comparator output signal is representative of level 1, and means responsive to the actuating signal for delivering to the demodulator 17 a pulse whose magnitude is a half of the first value of the first level selected signal.

Figure 5:
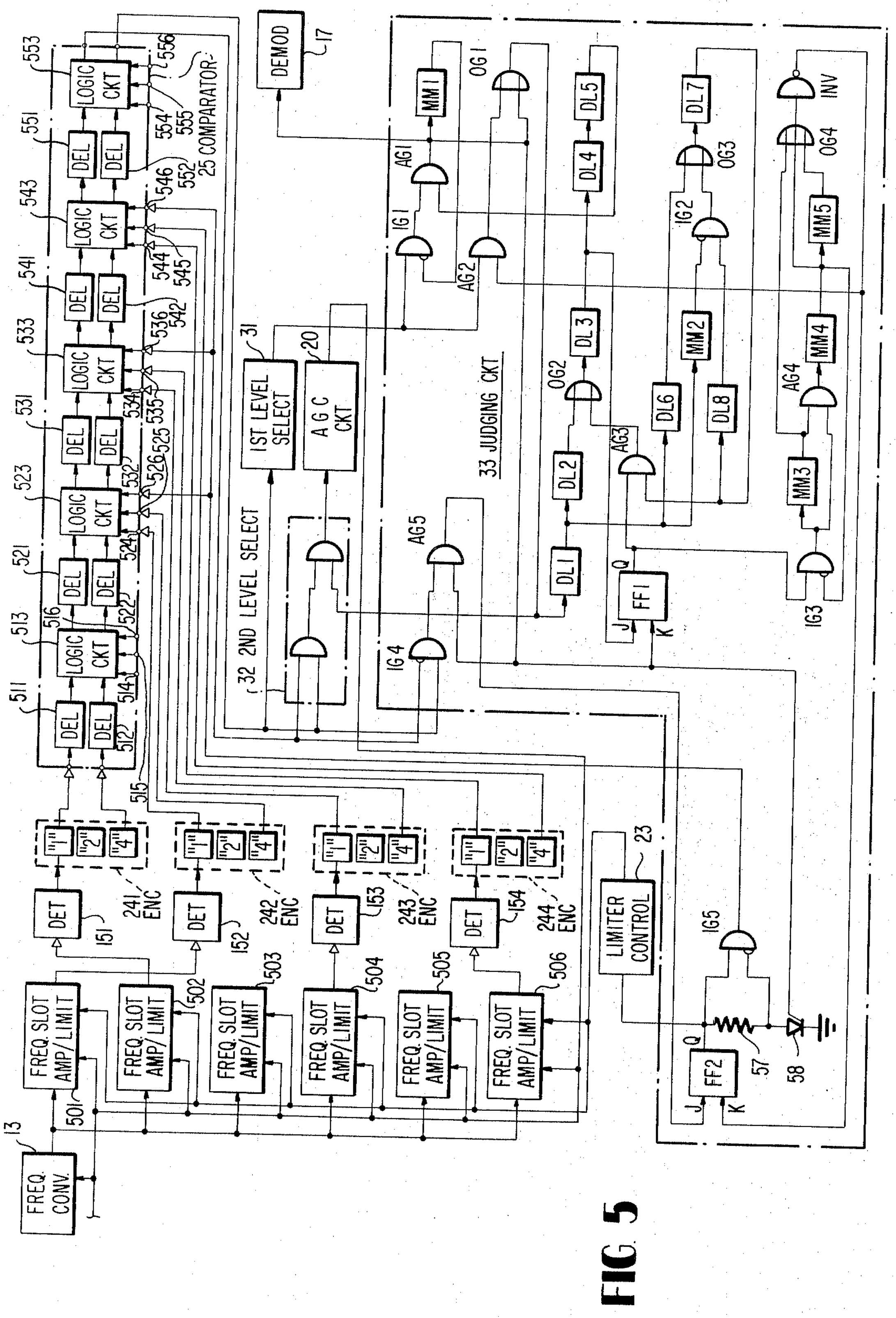
FIG. 5 shows a circuit diagram of a second embodiment of this invention, partly in blocks.

Referring to FIG. 5, it is assumed that the address for the F-T RADA receivers, such as illustrated therein, are given by various combinations of the frequency slots selected from six predetermined frequency slots F1 through F6 and the associated time slot selected from a like number of time slots T1 through T6 equally spaced in each sampling period of the information pulses and that the frequency and the time increase as the slot numbers increase from F1 to F6 and from T1 to T6. It is further assumed that the address for a second embodiment of the instant invention of an F-T RADA receiver shown in FIG. 5 is composed of four frequency slots F2, F1, F4, and F6 placed at the time slots T1, T3, T4, and T5, respectively. The second embodiment comprises, besides the receiving antenna, the radio frequency unit, and either the output terminal or the transmitting antenna omitted for the convenience of illustration, a frequency converter 13 for deriving from the radio frequency signal pulses the intermediate frequency signal pulses, four detectors 151, 152, 153, and 154 for signal pulses of the respective frequency slots F2, F1, F4, and F6, either a demodulator or a transmitter 17, an automatic gain control circuit 20, a limiter control circuit 23, and four binary encoders 241, 242, 243, and 244 for the second, the first, the fourth, and the sixth frequency slot pulses, all similar to the corresponding circuit units illustrated with reference to FIG. 1. The second embodiment further comprises a comparator 25, a first and a second level selector 31 and 32, and a judging circuit 33, all somewhat modified as compared with the equivalent circuit units depicted in FIG. 1. The second embodiment still further comprises, in place of the frequency selective amplifiers and the first and the second limiters shown in FIG. 1, six frequency slot amplifier/limiters 501, 502, 503, 504, 505, and 506, each of which in turn comprises a band pass filter having a pass band corresponding to that component of the intermediate frequency which corresponds to the frequency slot concerned, a gain controllable amplifier responsive to the gain control signal supplied thereto from the second level selector 32 through the automatic gain control circuit 20, and a level limiting amplifier responsive to the limiter control signal supplied thereto from the judging circuit 33 through the limiter control circuit 23. The level limiting amplifier may comprise a differential amplifier, means for adjusting the common electric current of the differential amplifier to the predetermined first level, and means responsive to the limiter control signal for further modifying the adjusted common current so as to provide the lower second level when the limiter control signal assumes the second value and for removing such modification when the limiter control signal is furnished with the first value. In accordance with the example of the frequency slots F2, F1, F4, and F6 arranged at the time slots T1, T3, T4, and T5, respectively, the second, the first, the fourth, and the sixth frequency slot amplifier/limiters 502, 501, 504, and 506 deliver the either once or in-effect twice level limited intermediate frequency signal pulses of the respective frequency slots to the decodes 151 through 154, respectively. The connection between these circuit untis are changeable as shown by white arrow heads. Alternatively, the second embodiment may comprise six detectors directly connected with the respective frequency slot amplifier/limiters 501 through 506 and means for variably connecting the pertinent decoders, such as those connected with the second, the first, the fourth, and the sixth amplifier/limiters 502, 501, 504, and 506, with the first through the fourth binary encoders 241 through 244, respectively. As will later be described, the first level selector 31 supplies the first level selected signal to the demodulator or the transmitter 17 through the judging circuit 33. Similarly, the second level selector 32 gives the second level selected signal either the first or the second value under the control effected by the judging circuit 33.

Further referring to FIG. 5, the comparator 25 comprises a first set of delay circuits 511 and 512 provided for only the least and the most significant digits of the frequency slot binary coded signal of the first time slot T1, respectively, and having a common delay time equal to the unit time slot interval, a first logic circuit 513 connected with the first delay circuits 511 and 512 and having the construction and operation similar to the logic circuit exemplified in FIG. 2 with omission of the circuitry for the intermediate digit or digits of the frequency slot binary coded signals of the concerned time slot, a pair of first input terminals 514 and 515 for supplying the least and the most significant digits of the frequency slot binary coded signal of the second time slot T2 to the first logic circuit 513, a single input terminal 516 for the mode selection signal for the first logic circuit 513, a like set of delay and logic circuits 521, 522, and 523 connected with the first logic circuit 513 and provided with input terminals 524, 525, and 526 for the second logic circuit 523, a third through a fifth set of delay and logic circuits 531, 532, 533, 541, 542, 543, 551, 552, and 553 successively cascaded to the second logic circuit 523 and provided with input terminals 534, 535, 536, 544, 545, 546, 554, 555, and 556, and a pair of comparator output terminals for supplying only the most significant digit of the comparator output binary coded signal to the first level selector 31 and both the least and the most significant digits of such a signal to the second level selector 32. In accordance with the time slots T1, T3, T4, and T5 of the address of the receiver, the least significant digit stages of the first through the fourth binary encoders 241 through 244 are adjustably connected with the least significant digit first delay circuit 511 and the second through the fourth logic circuit least significant digit input terminals 524, 534, 544, respectively. Likewise, the most significant digit stages of the binary encoders 241 through 244 are connected with the concerned delay circuit and input terminals 512, 525, 535, and 545, respectively, while the mode selection signal is applied only to the input terminals 526, 536, and 546 for the logic circuits 523, 533, and 543 supplied with the respective undelayed frequency slot binary coded signals. Other frequency slot binary coded signal input terminals 514, 515, 554, and 555 are left open which fact is equivalent to application thereto of signals whose values are all logic "0." Other mode control input terminals 516 and 556 are also left open which fact is equivalent to application thereto of the mode selection signal of the second value. The first logic circuit 513, which is now in the second mode, produces the delayed least and most significant digits of the first frequency slot binary coded signal. Similarly, the fifth logic circuit 553 produces a comparator output binary coded signal representative of a number which is equal to or greater than the number given by the least and the most significant digits of the binary coded signal produced by the fourth logic circuit 543. In other words, presence of the logic circuits, such as 513 and 553, supplied with no undelayed frequency slot binary coded signals is made substantially equivalent to absence of such logic circuits by rendering their mode selection signal input terminals, such as 516 and 556, open-circuit. It is to be noted here that the presence of the logic circuit whose frequency slot binary coded signal input terminals are open be made substantially equivalent to the absence thereof when such a circuit is put into either of the first and the second mode of operation according to the construction and operation of the circuit. It should further be noted that each of the logic circuits having the circuitry depicted in FIG. 2 deals with a pair of frequency slot binary coded signals in such a manner that each pair of levels 7 and 5, 6 and 4, 5 and 3, 3 and 3, and 2 and 0 is a pair of "like levels."

Still further referring to FIG. 5, the first level selector 31, supplied only with the most significant digit of the comparator output signal, produces a first level selected signal of logic "1" and "0" when the comparator output signal is representative of level 4, 5, 6, or 7 and level 0, 1, 2, or 3, respectively. The second level selector 32 similarly produces a second level selected signal of logic "1" and "0" when the comparator output signal is representative of level 5 or 7 and any one of the other levels. It is to be noted here that the comparator output signal appears through the second level selector 32 as a logic "1" signal if the "like level" thereof is higher by at least one level than it does through the first level selector 31. The second level selector 32 comprises a first AND gate which is an equivalent of the AND gate illustrated with reference to FIG. 1 and a second AND gate supplied with the first AND gate output pulses and with probable information pulses to be later mentioned from the judging circuit 33 for supplying the second level selected signal of logic "1" to the automatic gain control circuit 20 only when the comparator output signal is produced from the incoming signal pulses of the probable address. At any rate, the gain control signal appears to reduce the amplifier stage gains when the level of the comparator output signal is either 5 or 7. In accordance therewith, the predetermined second level is set at level 5 or 7. It may be presumed that the second level is set at level 7. In accordance with the fact that the first level selected signal becomes logic "1" when the level of the comparator output signal is either one of levels 4 through 7, the predetermined first level is set at any one of levels 0 through 3. It may be surmised that the first level is set at level 0 modulo 8.

Yet further referring to FIG. 5, it is presumed that the information signal is modulated at the transmitting end with the DATEC modulation of the sampling frequency of 20 kHz. It is to be noted that the first level selected signal never assumes the first value at a period equal to or shorter than the sampling period of 50 microseconds if the first level selected signal is the reproduction of the true information pulses. An example of the judging circuit 33 includes a predict gate circuit, such as disclosed in Japanese Patent Publication No. 12,974/1971, in turn comprising a first AND gate AG1 enabled in the manner later mentioned during probable presence of the true information pulses for producing a logic "1" pulse each time the first level selected signal becomes logic "1," a first monostable multivibrator MM1 triggered by each logic "1" pulse delivered from the first AND gate for producing a first logic "1" long pulse lasting for such a period, for example, of 60 microseconds as is longer than one sampling period and shorter than two sampling periods, a first inhibit gate LG1 inhibited by the logic "1" long pulse and supplied with the first level selected signal for letting that first level selected signal wnich is judged to be the DATEC information pulse pass therethrough and then through the first AND gate to be delivered to the demodulator or the transmitter 17 as the true information pulses, a second AND gate AG2 enabled in the manner later described during probable absence of the true information pulses for producing an initiation logic "1" pulse when the first level selected signal becomes logic "1" before the first level selected signal is judged to consist of the probable information pulses, a first OR gate OG1 responsive to the initiation pulse and the true information pulses for producing a first OR logic "1" pulse each time either the first level selected signal becomes logic "1" before the first level selected signal is judged to consist of the probable information pulses or a true information pulse appears after such judgement, a first delay circuit DL1 for delaying each first OR pulse by 8 microseconds, a second delay circuit DL2 for further delaying the first delayed signal by 16 microseconds, a second OR gate OG2 for passing the second delayed signal therethrough, a third delay circuit DL3 for delaying the second delayed signal by 14 microseconds, a fourth delay circuit DL4 for delaying the third delayed signal by 8 microseconds, a fifth delay circuit DL5 for delaying the fourth delayed signal by 8 microseconds and for delivering a delayed long logic "1" pulse to the first AND gate each time a fifth delayed logic "1" pulse is travelling therethrough, and a first J-K flipflop circuit FF1 supplied with the third delayed signal at the J input terminal and with the true information pulses at the K input terminal. It is now understood that the first flipflop circuit, supplied with logic "0" J input signal, produces a logic "0" output signal at the Q output terminal until 38 microseconds after the first level selected signal becomes logic "1" for the first time to appear through the second AND gate as the initiation pulse, when this flipflop circuit responsive to the logic "1" J input signal and logic "0" K input signal changes the Q output signal to logic "1" irrespective of its previous state. It is furthermore understood that the first AND gate is enabled at the time points of 50 ± 4 microseconds as measured from the time of appearance of the initiation pulse but that this gate does not produce a logic "1" pulse during this interval because the first level selected signal is now representative of a bit synchronizing signal 101010 . . . placed at the beginning of the information pulses. The predict gate circuit further comprises a sixth delay circuit DL6 for delaying the first delayed signal for 8 microseconds, a third OR gate OG3 for passing the sixth delayed signal therethrough, a seventh delay circuit DL7 for delaying the sixth delayed signal for 8 microseconds, an eighth delay circuit DL8 for delaying the seventh delayed signal for 42 microseconds, a second monostable multivibrator MM2 triggered by the logic "1" first delayed pulse for producing a second logic "1" long pulse for about 30 microseconds, a second inhibit gate IG2 inhibited by the second long pulse and supplied with the eighth delayed signal for transmitting the eighth delayed signal back to the seventh delay circuit through the third OR gate, and a third AND gate AG3 enabled by the Q output signal of the first flipflop circuit for forwarding the seventh delayed signal to the third delay circuit through the second OR gate. It is understood that a 50-microsecond loop including the seventh and the eighth delay circuits and the second inhibit gate applies logic "1" pulses to the third AND gate with a period of 50 microseconds. The second monostable multivibrator serves to eliminate the spurious or noise pulses other than the probable information pulses. The third AND gate is thus supplied with logic "1" pulses 24 microseconds after the appearance of the initiation pulse and every 50 microseconds after such 24-microsecond period to produce at least one logic "1" pulse 74 microseconds after the production of the initiation pulse. Consequently the Q output signal of the first flipflop circuit is again changed to logic "1" 88 microseconds after the initiation pulse, with the result that the third AND gate produces in cooperation with the 50-microsecond loop a succession of logic "1" pulses with a period of 50 microseconds. As a further consequence, the first AND gate is again and again enabled at the time points of 50m ± 4 microseconds as measured from the time point of the initiation pulse where *m* represents positive integers, to allow the bit synchronizing information pulses 101010 . . . pass therethrough. The K input terminal of the first flipflop circuit is now supplied with a logic "1" pulse to turn the Q output signal to logic "0" 100 microseconds after the initiation pulse. It is not appreciated that the Q output signal is first turned to logic "1" at a time point of 38 microseconds as measured from the production of the initiation pulse, returned to logic "0" at a time point of 100 microseconds, turnd again to logic "1" at a time point of 138 microseconds, and thus successively oscillates between logic "0" and 1"1" during the presence of the true information pulses. The predict gate circuit still further comprises a third inhibit gate IG3 not disabled in the manner mentioned hereunder for at least 138 microseconds after the appearance of the initiation pulse for passing the logic "1" Q output signal therethrough, a third monostable multivibrator MM3 triggered by the trailing edge of the third inhibit gate output pulse for producing a third logic "1" long pulse starting at the time point of 100 microseconds and lasting for about 3 milliseconds, a fourth OR gate OG4 supplied with the third long pulse, an inverter INV for delivering the inverted third long pulse to the second AND gate to disable the same after the time point of 100 microseconds, a fourth AND gate AG4 enabled by the third long pulse for passing the third inhibit gate output pulse therethrough, a fourth monostable multivibrator MM4 triggered by the trailing edge of the fourth AND gate output signal for delivering a fourth long logic "1" pulse lasting from the time point of 200 microseconds for about 6 milliseconds to the third inhibit gate to disable the same during the presence of the fourth long pulse and also to the fourth OR gate to lengthen the disablement of the second AND gate through the inverter if the Q output signal of the first flipflop circuit is turned again to logic "1" at the time point of 138 microseconds due to the presence of the true information pulses, and a fifth monostable multivibrator MM5 triggered by the trailing edge of the fourth long pulse for delivering a fifth long logic "1" pulse for about 9 milliseconds to the fourth OR gate. It is to be noted that when the first flipflop Q output signal oscillates between logic "1" and "0" during the presence of the fifth long pulse, the third inhibit gate checks this oscillation during about 6 milliseconds to disable the second AND gate for about 15 milliseconds after the third inhibit gate has found that the information pulses have ceased.

Further referring to FIG. 5, the judging circuit 33 further comprises a fourth inhibit gate IG4 inhibited by the least significant digit of each comparator output signal for producing logic "1" pulses when the comparator output signal is representaive of levels 6 and 4, a fifth AND gate AG5 enabled in the presence of the true information pulses for producing a logic "1" pulse each time the comparator output signal derived from the incoming signal pulses of the probable address represents either of levels 6 and 4, a second J-K flip-flop circuit FF2 supplied with the fifth AND gate output signal at the J input terminal and with the output signal of the inverter at the K input terminal for producing at its Q output terminal the limiter control signal supplied to the limiter control circuit 23, a resistor 57 connected with the Q output terminal of the second flipflop circuit, a high speed thyristor 58 supplied with the Q output signal through the resistor 57 at its anode and with the true information pulses at its gate electrode, and a fifth inhibit gate IG5 inhibited by the anode potential of the thyristor 58 and supplied with the Q output signal of the second flipflop circuit. The fourth inhibit gate may be deemed as a circuit element of the second level selector 32. Incidentally, the initiation pulse and the true information pulses derived from the first OR gate is supplied to the second AND gate in the second level selector 32, which may be deemed a circuit element of the judging circuit 33.

While the receiver is in Stage A of operation and while the incoming signal pulses do not bear the probable address of the receiver, the first inhibit and the second AND gates IG1 and AG2 are left open but the first AND gate AG1 is disabled. The second level selector 32 does not supply the gain control signal to the automatic gain control circuit 20. Supplied with logic "1" signal from the inverter INV, the second flipflop circuit FF2 delivers the logic "0" Q output signal to the limiter control circuit 23 as the limiter control signal of its second value and to the fifth inhibit gate IG5 to enable the latter but make the same apply a logic "0" signal to the comparator 25 as the mode selection signal of its first value. If a set of the simultaneously appearing comparator output pulses happen to represent level 4 or higher, the second AND gate AG2 produces the initiation pulse. Responsive thereto, the first AND gate AG1 is enabled for 8 microseconds including each sampling time. When a second comparator output signal happens to appear at one of these 8-microsecond periods and to represent also level 4 or higher, the first AND gate AG1 produces a probable information pulse for the first time. This first probable information pulse triggers the third monostable multivibrator MM3 through toggling of the first flipflop circuit FF1 to disable the second AND gate AG2 and prepare the second flipflop circuit FF2 for toggling for about 3 milliseconds. If the first comparator output signal is either representative of level 5 or 7, the second level selector 32 supplies a gain control signal. Because of the time constant of the automatic gain control, it is unlikely that the second comparator output signal is either indicative of level 4 or level 6. It is also unbelievable under the circumstances that a third comparator output signal happens to occur during the enabled period of the first inhibit gate IG1 and furthermore to become indicative of level 4 or higher. If the signal pulses of the probable address reach the receiver, the comparator output signal becomes representative of level 4 or higher in synchronism with the enabled periods of the first inhibit gate IG1 to be supplied to the demodulator or the transmitter 17 as the true information pulses. When the amplifier stage gains are reduced to provide the comparator output signal either with level 4 or level 6, the second level selector 32 no more supplies the gain control signal to the amplifier stages to allow rise of the gains with sufficiently long time constant. At the same time, the fourth inhibit gate IG4 produces logic "1" pulses. Responsive thereto, the second flipflop circuit FF2 is now actually toggled through the intermittently enabled fifth AND gate AG5 to change the limiter control signal from its second value to its first value and to disable the fifth inhibit gate IG5 for the time being to maintain the mode selection signal if its first value. The receiver is now put into Stage B.

If the receiver has stepped into stage B as a result of misconnection, the comparator output signal will become representative of level 0 in due course. Inasmuch as the first level selector 31 now produces no logic "1" pulse, the automatic gain control is rendered ineffective with the relatively long time constant although the second flipflop circuit FF2 keeps its logic "1" Q output signal. The first flip-flop circuit FF1 also keeps its logic "1" Q output signal with the result that the third through the fifth monostable multivibrator MM3 through MM5 are all reset in about 18 milliseconds to reset in turn the second flipflop circuit FF2. The receiver thus returns to Stage A. If the probable address is the ture true the comparator output signal will become indicative of either of levels 4 through 7 with a considerable probability so as to enable the fifth inhibit gate IG5 through the thyristor 58 to make the same forward the logic "1" Q output signal of the second flipflop circuit FF2 to the comparator 25 as the mode selection signal of its second value. The receiver is thus put into Stage C.

In Stages B and C the probability that the comparator output signal resulting from false address pulses causes the first level selector 31 to produce a logic "1" pulse which passes through the first inhibit and AND gates IG1 and AG1 to allow the second level selector 32 deliver a logic "1" pulse to the automatic gain control circuit 20, is very little, with the result that it is possible to effect more reliable automatic gain control than in Stage A. The judging circuit 33 may be modified in such a manner that a logic product of the first AND gate and the fifth inhibit gate output signals is delivered to the demodulator or the transmitter 17 so that the information pulses may be derived only in Stage C. This is equivalent to the technique of squelching and provides an additional merit of clearly distinguishing between the presence and the absence of the information pulses.

Figure 6:
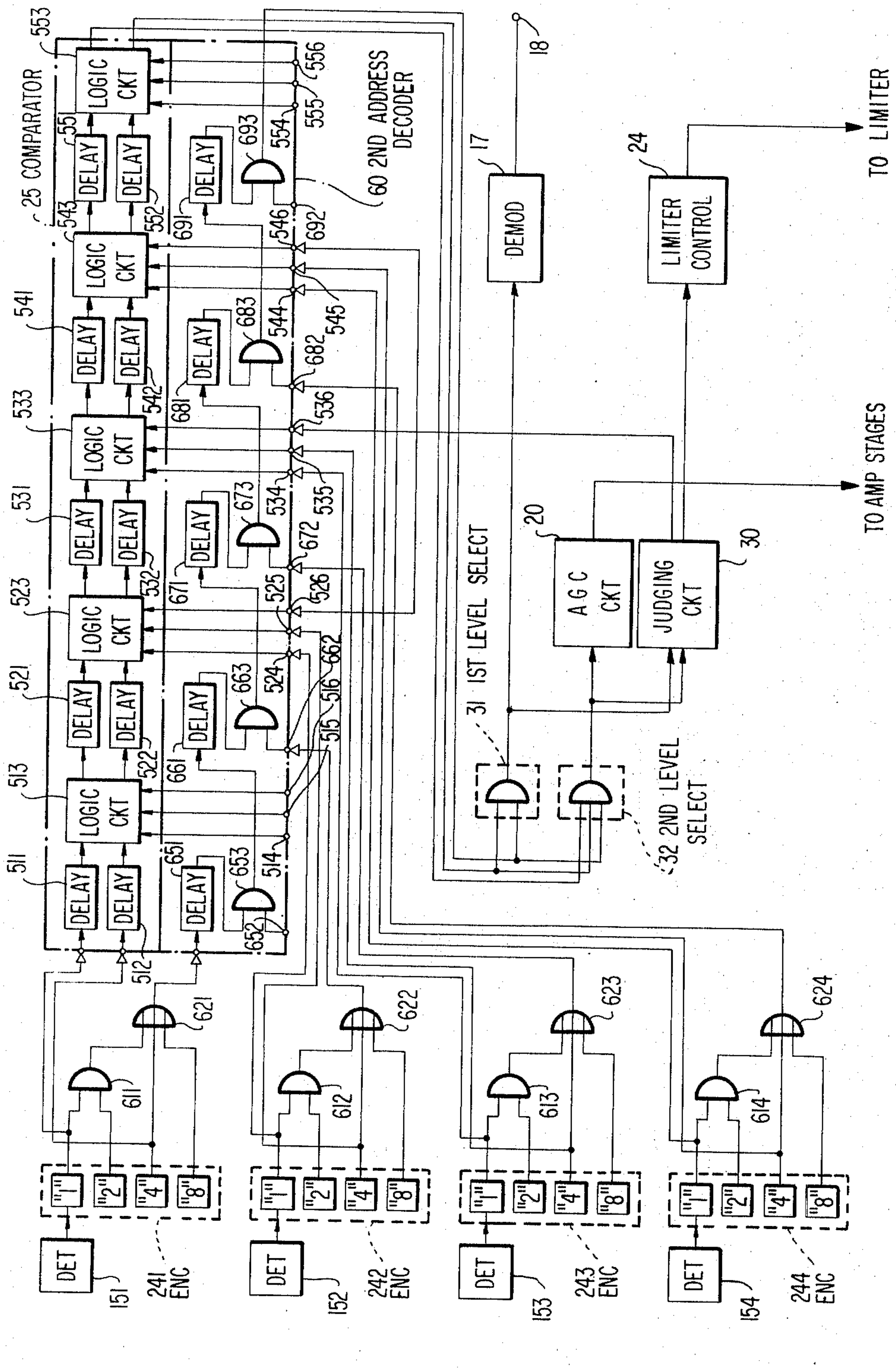
FIG. 6 is a block diagram of a third embodiment of the present invention.

Referring finally to FIG. 6, a third embodiment of the present invention which is specifically suitable for the ternary modulation and the transponder repeating comprises, instead of the three-stage binary encoders and the comparator illustrated with reference to FIG.

5, four-stage binary encoders 241, 242, 243, and 244 for encoding the analog signal pulses modulo 8 as before, a comparator 25 supplied with the next significant digits of the frequency slot binary coded signals at the pertinent ones of the first more significant digit delay circuit 512 and the more significant digit input terminals 515 through 555 and provided with a second address decoder 60, a set of AND gates 611, 612, 613, and 614, each supplied with the first and the second stage output signals of the corresponding one of the encoders 241 through 244, and a set of OR gates 621, 622, 623, and 624, each delivering a logic sum of the output signals of the associated one of the AND gates 611 through 614 and the stages "2" and "4" of the related one of the encoders 241 through 244 to the second address decoder 60. Each of the OR gates 621 through 624 produces a logic "1" signal when the corresponding frequency slot binary coded signal is representative of level 3 or higher. The second address decoder 60 comprises a first additional delay circuit 651 for the first time slot level-three-or-higher signal, a first additional input terminal 652 for the second time slot level-three-or-higher signal, a first AND gate 653 supplied with the signals from the first additional delay circuit and input terminal 651 and 652, a second additional delay circuit 661 supplied with the signal from the first AND gate 653, a second additional input terminal 662, for the third time slot level-three-or-higher signal, a second AND gate 663 similarly connected with the second additional delay circuit and input terminal 661 and 662, and successively cascaded similarly connected third through fifth sets of additional delay circuits, additional input terminals, and AND gates 671, 672, 673, 681, 682, 683, 691 692, and 693. The fifth AND gate 693 supplies an additional bit of the comparator output signal to the first level selector 21. The open circuited additional input terminals are made as though they are supplied with logic "1" signals. The first level may be any one of the levels, such as levels 9, 10, and 11, that makes the encoders 241 through 244 produce logic "1" pulses from their respective "8" stages but not from their "4" stages. By way of example, the first level is set at level 8. The first level selector 31 selects the information pulses as the logic product of the first and the second address decoder output signals.

The second address decoder 60 serves as a conventional F-T matrix decoder for the signal pulses that produce the frequency slot binary coded signals having level 3 or higher. It should be recalled here that the receiver reproduces the information pulses in Stage C of operation as the logic sum of the pulses of the combined frequency, time, and level slots of the incoming radio frequency signal pulses. This means that the information pulses are reproduced if at least one set of the address pulses is contained in the series of the address pulse sets that satisfies the predetermined relation among the frequency, the time, and the level slots. Although the receivers according to the first and the second embodiments have strong filtering action for levels, there are some chances of reproducing information pulses from the false address pulses to reduce the adaptability of this invention to the ternary modulation or the transponder repeating systems. In contrast the third embodiment is capable of reducing the undesirable chances of producing information pulses from the so-to-speak imaginary address pulses which result in the probable address pulses despite the complete absence of other address-giving pulses. The level 3 used as the lowest level in the second address decoder 60 serves to pick up those true address signal pulses which have undergone such disturbances during the transmission as the accidental increase of the loss at a particular frequency range. It is therefore possible to select the level for the second address decoder 60 in consideration of the avoidance of the false address pulses and the regeneration of the accidentally lost true address pulses. As a further alternative, the second address decoder 60 may not be supplied from the encoders 241 through 244 but from the detectors 151 through 154 through means for producing the frequency slot pulses of logic "1" for pulses whose levels are above a slice level, such as level 3. It should also be mentioned in connection with the first and the second embodiments applied to a ternary delta modulation that it is inevitable to pay more strict attention to the two addresses given by the plus and the minus sides than for the conventional F-T RADA receiver. This is because the receivers according to this invention produces the information pulses as the logic sum in Stage C. In contrast the third embodiment reduces the strictness to the same degree as for the conventional F-T RADA receivers. In addition, the third embodiment obviates the necessity of interswitching between Stages A and C in transponder repeating and may be furnished with raised capability of rejecting the false address pulses with provisions of pulse width discriminating means, which interswitching is desirable with the first and the second embodiments because it is preferable to continue the reception in Stage A rather than in Stage C of the radio frequency signal pulses whose levels are rendered relatively uniform by the transponder repeaters.

While the instant invention has thus far been described, it is to be understood that the relation between the levels of the frequency slot pulses derived from the detectors 151 through 153 or 154 and the binary numbers represented by the binary coded signals produced by the encoders 142 through 243 or 244 is optional. The quantized levels for reproducing the information pulses, such as levels 6 and 7 used in the specific example of the first embodiment, should cover the deviation in the power at the transmitting end and in the gain of the receiver amplifier stages for the respective frequency slots and the fluctuation caused to the incoming signal level by the transmission path. The quantized levels for effecting the automatic gain control, such as level 7 used in the specific example, should preferably be the highest quantized level or a small number of consecutive quantized levels including the highest one. In connection with these, it is possible to apply the known technique of the nonlinear encoding to such relations. In this event, it is possible to encode the frequency slot pulses in such a manner that there is not the highest level for such pulses. It should consequently be noted that the automatic gain control may be put into operation when the levels of the probable address pulses merely approach the highest level. It is also possible to use, instead of each of the binary encoders 241 through 243 or 244, an encoder for encoding the analog signal pulses into any quantized signals, such as an I-ary code where I is a positive integer, with respect to a modulus of any predetermined number greater than I. The encoders may be of the counter type, the feedback type, or any other type capable of providing the encoding modulo a predetermined integer.

It is to be reminded here that this invention obviates to a great extent the necessity of avoiding the leakage of a signal pulse into the adjacent frequency and/or time slots. Consequently a receiver may comprise a local oscillator for generating the local oscillation whose frequency is changed in compliance with the address of the receiver and a sole frequency selective amplifier supplied with the local oscillation. This technique which is resorted to in a RADEM receiver has been objectionable in a conventional F-T RADA receiver because the local oscillation serves in a frequency mixer as a rectangular-wave oscillation to increase the inter-slot leakage. In correspondence to the sole frequency selective amplifer, the receiver may comprise a sole limiter and a sole binary encoder for all frequency slots. The first address decoder in the comparator 25 may comprise, instead of the delay circuits provided at least for some of the digits of the frequency slot binary coded signals, delay circuits and logic circuits therefor, the number of the delay circuits being either equal to the number of the possible time slots for each frequency slot or equal to a like number for all frequency slots. Each delay circuit may be a distributed constant delay line, a lumped constant delay line, a shift register, a piezoelectric delay line, a magnetostriction delay line, a series of cascaded multivibrators, or any other delay means. When a comparator is capable of carrying out the comparison between the corresponding digits of the frequency slot digital signals up to a digit higher than the most significant digit of the digital signals, the superfluous digit or digits of the comparator are supplied in effect with zero. In addition, the comparator may be provided with a smaller number of those output terminals than a set of the input terminals from which the comparator output signal representative of some like levels are derived. It is preferable to provide the automatic gain control with a larger time constant on stepping into Stage B than on stepping into Stage A or C. The logic circuit illustrated with reference to FIG. 3 somewhat raises the probability of producing the false address pulses in Stage C but it is to be noted that the probability is small because the false address pulses are derived only from the radio frequency signal pulses having specific levels. The judging circuit 33 may be of any construction that is capable of operating in the manner mentioned above.

What is claimed is:

1. A receiver for a RADA system including frequency slot means for selecting from incoming radio frequency signal pulses the ones of said pulses having a frequency corresponding to any of the frequency slots assigned to said receiver, said ones of said pulses being frequency selected pulses, time slot means for selecting from said frequency selected pulses each group of said frequency selected pulses which correspond in frequency and time relationship to the frequency/time slot address of said receiver, said last mentioned selected group of pulses being time slot selected pulses, and automatic gain control amplification means for controlling, in response to a gain control signal, the levels of said frequency selected pulses, wherein the improvement comprises limiter means connected to receive said frequency selected pulses and responsive to a limiter control signal for selectively limiting the levels of said frequency selected pulses to a first predetermined high level and to a second predetermined medium level when said limiter control signal has a first and a second value, respectively, analog to digital converting means, connected to receive said frequency selected pulses from said limiter means, for converting each said frequency selected pulse into a quantized signal with respect to a modulus representative of said first predetermined high level, comparator means connected to receive said quantized signals for comparing said quantized signals with one another to produce a comparator output quantized signal representative of a level which is at most equal to the minimum of the quantized signals compared, first level selector means connected to said comparator and responsive to said comparator output quantized signals for producing a series of first level selector output pulses when the levels of said comparator output quantized signals are equal to or higher than a third predetermined level which is lower than said second predetermined level, second level selector means connected to said comparator and responsive to said comparator output quantized signals for producing said gain control signal for reducing the gain of said automatic gain control amplification means when said comparator quantization signal levels are at least equal to said second predetermined medium level, and limiter control signal producing means responsive to the outputs of said first and second level selector means for producing said limiter control signal of said first and said second values when the comparator output quantization signals fall within a range between said third and said second predetermined levels and outside thereof, respectively, said second predetermined level comprising the highest quantization level with respect to said modulus.

2. A receiver according to claim 1, wherein said comparator means is further capable of producing another comparator output signal representative of a level which is at least equal to the maximum quantization level of said compared quantization signals, said receiver further comprising means, connected to said comparator means and to said limiter control signal producing means, responsive to said levels represented by said comparator output signals for switching said comparator from producing the first-mentioned comparator output quantized signals to producing the second-mentioned comparator output quantized signals a predetermined time after said limiter control signal producing means has produced said limiter control signal of said first value.

3. A receiver according to claim 2, further comprising address decoder means responsive to said quantized signals for producing an output pulse in response to a group of said quantized pulses representing said frequency selected pulses which occur in the relative time slots corresponding to the frequency/time slot address of said receiver and which quantized pulses all have at least a predetermined minimum value set at a level no greater than said third predetermined level, and means connecting the output from said address decoder to said first and second level selector means for preventing said first and second level selector means from providing respective outputs in the absence of an output pulse from said address decoder.

4. A receiver for a RADA system of the type in which an information pulse in a time period is represented by a set of pulses of certain frequencies occurring during certain respective time slots of said time period, said certain frequencies and certain time slots representing the address of said receiver, and said set of pulses being frequency/time slot pulses bearing the address of said receiver; said receiver comprising:

a. first means responsive to a set of received frequency/time slot pulses for determining if said set of frequency/time slot pulses correspond in time and frequency to the address of said receiver, and b. second means responsive to said first means for comparing the levels of the said frequency/time slot pulses with each other for providing an output indication of the existence of an information pulse if the said frequency/time slot pulses are within predetermined relative magnitudes of one another.

5. A receiver as claimed in claim 4 wherein said first means comprises:

a. a plurality of frequency pulse detecting means for providing amplitude pulses in response to receipt of a frequency/time slot pulse having a frequency within the address of said receiver, and b. a comparator means responsive to said amplitude pulses for providing relative delays to said amplitude pulses and detecting the coincidence of said relatively delayed amplitude pulses, above a minimum amplitude level, whereby said relative delays imparted to the amplitude pulses determine the address of said receiver.

6. A receiver for a RADA system comprising first decoding means responsive to a set of pulses having a prefixed frequency and time relationship for producing a first output provided each pulse of said set has an amplitude above a minimum amplitude, means responsive to said first output for reducing the gain of said receiver until the lowest amplitude pulse of said set of pulses reaches a predetermined low level, disabling means responsive to said lowest amplitude pulse reaching said predetermined low level for disabling said gain reducing means, and means responsive to said lowest amplitude pulse reaching said predetermined low level for detecting the presence or absence of one of said pulses of said set having an amplitude above a predetermined maximum level whereby the amplitudes of said set of pulses must be within said predetermined low and maximum levels to represent a non-spurious information signal intended for said receiver.

7. A receiver for a RADA system comprising:

a. means for receiving and varying the amplitude of frequency/time slot pulses representative of information pulses transmitted to said receiver, b. a plurality of frequency detection means connected to said receiving and varying means, each for detecting the presence of a pulse of a respective frequency among said frequency/time slot pulses, and providing corresponding amplitude pulses, c. limiter means for limiting said amplitude pulses to a medium and high level, respectively, when in first and second states, d. encoding means for converting said limited amplitude modulated pulses into digitally encoded pulses modulo X representing said amplitude pulses, where X is above said medium level and not less than said high level, e. comparator means responsive to a set of said digitally encoded pulses, which set of pulses have the proper time relationship corresponding to the time slots of the address of said receiver for providing an output at least as low as the lowest one of said digitally encoded pulses out of said set, f. limiter control means responsive to the output of said comparator means for placing said limiter means in said second state when said comparator output is representative of a predetermined first level amplitude below said medium and high levels, and for otherwise placing said limiter means in said first stage, and g. means responsive to said comparator output being equal to said medium level for causing said means for receiving and varying to reduce the amplitudes of said frequency/time slot pulses.

8. A receiver as claimed in claim 7 further comprising information pulse output means for providing an information pulse output in response to a comparator output equal to or greater than said first level.

9. A receiver as claimed in claim 7 further comprising information pulse output means responsive to successive comparator outputs equal to or exceeding said first level for providing an information pulse output in response to each first level comparator output which occurs within a predetermined time period following a preceding first level comparator output.

10. A receiver as claimed in claim 9 wherein said information pulse output means comprises:

a. first level select means responsive to each comparator output equal or above said first level for producing a first level pulse, b. a first normally blocked gate, for passing, when unblocked, said first level pulses to the output thereof representing said information pulses, c. a second normally unblocked gate for passing, when unblocked, said first level pulse to the output thereof as initiation pulses, d. timing means responsive to said initiation pulses for periodically unblocking said first gate, and e. blocking means responsive to said information pulse for blocking said second gate for a predetermined period of time.

11. A receiver as claimed in claim 10 further comprising mode control means for causing said comparator means to provide an output corresponding at least to the maximum of said digitally encoded pulses applied thereto in response to the successive occurrence of: (a) activation of said blocking means, (b) a comparator output equal to a level just below said medium level, and (c) an information pulse.

12. A receiver as claimed in claim 7 wherein said limiter control means holds said limiter means in said second state for at least a predetermined time following entry into said second state.

13. A receiver as claimed in claim 7 further comprising mode control means responsive to a comparator output of said first or greater level occurring a predetermined time after said limiter means is in said second state for causing said comparator means to provide an output corresponding at least to the maximum input encoded amplitude pulses.

* * * * *

UNITED STATES PATENT OFFICE
CERTIFICATE OF CORRECTION

Patent No. 3,825,691 Dated July 23, 1974

Inventor(s) Takamichi Honma et al

It is certified that error appears in the above-identified patent and that said Letters Patent are hereby corrected as shown below:

In The Specification:

Column 4, line 11, after "first" change "valve" to -- value --

Column 7, line 33, after "third" "signals" should be -- signal --

Column 8, line 53, "contro" should be -- control --

Column 9, line 57, "outut" should be -- output --

Column 11, line 11, delete "value"

Column 11, line 15, "addresss" should be -- address --

Column 14, line 66, "untis" should be -- units --

Column 18, line 32, "not" should be -- now --

Column 18, line 36, "turnd" should be -- turned --

Column 18, line 38, after "and" delete "1" (first occurrence)

Column 20, line 38, after "the" (first occurrence) delete "ture"

Column 22, line 43, "142" should be -- 241 --

Signed and sealed this 17th day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE : 869-930